United States Patent [19]

Tinker et al.

[11] Patent Number: 4,520,084

[45] Date of Patent: May 28, 1985

[54] ETCHED METAL ELECTRODES AND THEIR USE IN NONAQUEOUS ELECTROCHEMICAL CELLS

[75] Inventors: Lawrence A. Tinker, Lions Bay; Allan C. Harkness, Vancouver, both of Canada

[73] Assignee: Standard Oil Company (Indiana), Chicago, Ill.

[21] Appl. No.: 618,244

[22] Filed: Jun. 7, 1984

[51] Int. Cl.$^3$ .............................................. H01M 6/14
[52] U.S. Cl. .................................... 429/101; 429/197; 429/201; 429/218
[58] Field of Search ........ 429/101, 105, 194, 196–201, 429/218

[56] References Cited

U.S. PATENT DOCUMENTS

| | | | |
|---|---|---|---|
| 3,508,967 | 4/1970 | Lyall et al. | 429/217 |
| 3,567,515 | 3/1971 | Maricle et al. | 429/105 |
| 4,091,152 | 5/1978 | Rao et al. | 429/101 |
| 4,400,453 | 8/1983 | Blomgren | 429/196 |

*Primary Examiner*—Anthony Skapars
*Attorney, Agent, or Firm*—Richard A. Kretchmer; William T. McClain; William H. Magidson

[57] ABSTRACT

Active metal electrodes for use in nonaqueous electrochemical cells are improved by etching with an alcohol.

20 Claims, No Drawings

ETCHED METAL ELECTRODES AND THEIR USE IN NONAQUEOUS ELECTROCHEMICAL CELLS

BACKGROUND OF THE INVENTION

1. Field of the Invention

This invention relates to a method for improving the properties of active metal electrodes for use in nonaqueous electrochemical cells. More particularly, it relates to a process for the modification of conventional active metal electrodes by etching with an alcohol.

2. Description of the Prior Art

A substantial amount of interest has recently been centered on the development of ambient temperature, high energy density, electrochemical cells which are light in weight and capable of providing a higher voltage than conventional cells such as nickel-cadmium and lead-acid systems or alkaline cells having zinc anodes. The high energy density cell systems which are currently of interest typically involve the use of active metals (metals above hydrogen in the electromotive series of elements which are unstable in an aqueous environment) as anodes in combination with nonaqueous electrolytes. As used herein, "nonaqueous" is intended to mean substantially free of water.

In conventional electrochemical cells, cathode depolarizers are used in a form which will permit an intimate and maximum contact with an external electrical circuit, such as a set of wires connecting the electrodes of a cell, while also effecting a physical separation of the cathode depolarizer from the anode. In such cells, the cathode depolarizer is generally an insoluble, finely divided solid which is either admixed with or used as a coating over an inert conducting material, such as nickel, graphite or carbon rod, which serves as a current collector or cathode. The physical separation of the cathode depolarizer from the anode is necessary to prevent a direct chemical reaction between the anode material and the cathode depolarizer which would result in self-discharge of the cell.

Until recently, it was generally believed that a direct physical contact between the cathode depolarizer and the anode could not be permitted within an electrochemical cell. It has been discovered, however, that certain cathode depolarizers do not react chemically to any appreciable extent with active metal anodes at the interface between the anode and the cathode depolarizer. Accordingly, with materials of this type, it is possible to construct an electrochemical cell wherein an active metal anode is in direct contact with the cathode depolarizer. For example, U.S. Pat. No. 3,567,515 issued to Maricle et al. on Mar. 2, 1971, discloses the use of sulfur dioxide as a cathode depolarizer in such a cell. Similarly, U.S. Pat. No. 3,926,669 issued to Auborn on Dec. 16, 1975, discloses that certain liquid inorganic oxyhalides and thiohalides, such as thionyl chloride, sulfuryl chloride and phosphorus oxychloride, can be utilized as cathode depolarizers in such a cell.

Consistent with the disclosure of Maricle et al. in the above-mentioned U.S. Pat. No. 3,567,515, ultra-pure lithium electrodes prepared by vapor deposition of lithium on a glass substrate are stable when placed in direct contact with an electrolyte which comprises sulfur dioxide and in which the dithionite discharge product is soluble. However, we have found that a relatively rapid self-discharge usually occurs when the lithium electrode is fabricated from bulk samples of commercially supplied lithium. For example, when commercial lithium foil is placed in an electrolyte which comprises sulfur dioxide and in which the dithionite discharge product is soluble (dithionite anion is the sulfur dioxide reduction product), one usually observes one or more spots appearing on the lithium surface from which a red to black colored material is released. In some cases, only a few such spots will appear. More typically, however, large areas of the lithium electrode will be covered with such spots. When the lithium electrode is coupled with a carbon cathode, the open circuit voltage of the resulting electrochemical cell decays rapidly as a consequence of the self-discharge process. This self-discharge represents a major obstacle to the construction of a satisfactory electrochemical cell which comprises an active metal anode, a sulfur dioxide cathode depolarizer, and an electrolyte solution in which the dithionite discharge product is soluble. The prior art fails to disclose any method for either the control or prevention of this self-discharge.

Various alcohols, typically in combination with an inert hydrocarbon diluent, have been utilized to chemically polish and etch alkali metals. A survey of the use of various alcohols to polish lithium, sodium and potassium has been reported by R. N Castellano et al., *J. Electrochem. Soc.: Solid State Science*, 118, 653 (1971). In addition, it has been reported that the surface of solid lithium can be cleaned by immersion in a mixture of solid $CO_2$ and methyl alcohol [*Aluminum-Lithium Alloys* (Proceedings of the First International Aluminum-Lithium Conference sponsored by the TMS-AIME Nonferrous Metals Committee at Stone Mountain, Ga., May 19-21, 1980), T. H. Sanders Jr. and E. A. Starke Jr., Ed., The Metallurgical Society of AIME, p. 20].

SUMMARY OF THE INVENTION

The present invention is directed to the discovery that the properties of certain active metal electrodes for use in electrochemical cells can be improved by etching these electrodes with an alcohol. More specifically, it has been discovered that this etching serves to prevent or control the self-discharge of the electrode when it is placed in contact with a cathode depolarizer with which it should be compatible.

One embodiment of the invention is an electrochemical cell comprising in combination: (a) a cathode; (b) a nonaqueous, conductive, liquid electrolyte which comprises a cathode depolarizer; and (c) a solid electrode comprising at least one metal selected from the group consisting of lithium, sodium, potassium and calcium, said electrode having a surface which has been modified by contact with a liquid etching agent comprising at least one alcohol selected from the group consisting of alcohols which contain up to about 30 carbon atoms.

Another embodiment of the invention is an electrochemical cell comprising in combination: (a) a cathode; (b) a nonaqueous, conductive, liquid electrolyte which comprises liquid sulfur dioxide having at least one electrolyte salt dissolved therein which is selected from the group consisting of quaternary ammonium salts, phosphonium salts, pyridinium salts and arsonium salts; and (c) a solid electrode comprising lithium, said electrode having a surface which has been modified by contact with a liquid etching agent comprising at least one alcohol selected from the group consisting of alcohols which contain up to about 30 carbon atoms.

An object of the invention is to provide an improved electrochemical cell.

Another object of this invention is to provide an improved active metal electrode for use in nonaqueous electrochemical cells.

A further object of this invention is to provide an active metal electrode which has a reduced tendency to self-discharge when combined with a cathode depolarizer with which it should be compatible.

DETAILED DESCRIPTION OF THE INVENTION

We have found that certain active metal electrodes for use in nonaqueous electrochemical cells can be improved by etching with an alcohol. Suitable active metal electrodes for use in the practice of this invention comprise at least one metal selected from the group consisting of lithium, sodium, potassium and calcium. All of these metals are characterized by the ability to react chemically with an alcohol to produce elemental hydrogen and a metal alkoxide. In view of this reactivity, the etching agent has the ability to modify the electrode surface by removing surface layers of the metal through the formation of a metal alkoxide which is typically soluble in the etching agent. Lithium and sodium are preferred metals for use as active metal electrodes in view of their high electrodes potential and low equvalent weight. Lithium is highly preferred since it has the ability in an electrochemical cell to provide the highest performance in watt-hours per pound of all known active metals.

Although essentially any alcohol can be used in the practive of this invention, preferred alcohols contain up to about 30 carbon atoms. It will be appreciated, of course, that suitable alcohols can contain functional groups, in addition to one or more hydroxyl groups, which include, but are not limited to alkoxy, aryloxy and carboalkoxy groups. However, any such other functional groups should be substantially inert with respect to the active metal of the electrode. Monohydroxy aliphatic alcohols containing up to 10 carbon atoms are particularly preferred in view of their availability, volatility, and the fact that such materials are typically liquids. Suitable alcohols include, but are not limited to methanol, ethanol, 2-propanol, 3-pentanol, 1-heptanol, 1-octanol, 2-octanol, 1-nonanol, p-isopropylbenzyl alcohol, 2-methyl-2-butanol, 2-methyl-1-propanol, and 1,6-hexanediol. It will be appreciated, of course, that the etching agent of this invention can comprise mixtures of two or more alcohols.

Liquid alcohols can be used as the etching agent and directly contacted with the active metal electrode. However, a preferred embodiment of the invention involves the combination of a substantially inert liquid diluent or solvent with the alcohol. The liquid diluent permits the use of alcohols which are either solids or highly viscous liquids. In addition, the liquid diluent is useful in assisting in the removal of metal alkoxide as it is formed at the electrode surface. Further, the liquid diluent also serves to reduce the rate of reaction between the alcohol etching agent and the metal of the electrode. For example, a violent reaction takes place when undiluted methanol is contacted with potassium at room temperature. Suitable liquid diluents include, but are not limited to ethers and aromatic compounds, such as tetrahydrofuran, diethyl ether, ethylene glycol dimethyl ether, benzene, toluene and xylene. Preferred diluents are those which are solvents for the alkoxide which is produced by reaction of the electrode metal with the alcohol etching agent. However, it will be appreciated that this invention does not require the complete removal of metal alkoxide from the electrode surface.

In the practice of this invention, the active metal electrode is contacted with an amount of the etching agent for a period of time and at a temperature which are effective to result in a modification of the surface of the electrode. This contacting serves to remove at least some metal, and preferably a minor amount of metal, from the electrode surface as a consequence of the metal reacting with the etching agent. A preferred method of contacting the active metal electrode with the etching agent involves a simple dipping of the electrode in a liquid etching agent.

After modification of the electrode surface by the etching agent, the electrode is removed from contact with the etching agent. If desired, residual traces of the etching agent can be removed from the electrode after such contacting by conventional techniques, such as evaporation, wiping with a lint free absorbent material or washing with a substantially inert solvent. Suitable solvents for this purpose include, but are not limited to ethers and aromatic compounds, such as tetrahydrofuran, diethyl ether and ethylene glycol dimethyl ether, benzene, toluene and xylene. Removal of residual traces of etching agent by washing with a solvent or wiping with an absorbent material are preferred since these methods serve to rapidly remove the etching agent and, thereby, quickly terminate the etching reaction. In addition, these preferred methods also assist in the removal of any adhering film of metal alkoxide which may have formed on the electrode surface. However, if the etched electrode is wiped, care must be taken not to contaminate the electrode surface with lint or particulates which could cause the self-discharge of the electrode when it is incorporated into an electrochemical cell.

Although the subject invention is not to be so limited, it is believed that commercially supplied bulk samples of active metals carry significant amounts of surface impurities. In addition, the fabrication of these metals into electrodes for use in electrochemical cells carries with it the probability that additional impurities will be attached to the surface of the resulting electrode. For example, mere contact with a cutting tool can serve to contaminate the electrode surface. When an active metal electrode is utilized in an electrochemical cell wherein it is in direct contact with a cathode depolarizer, particulate surface impurities can act as small cathodes which are in direct electrical contact with the active metal electrode. As a consequence, self-discharge can take place. The etching agent of this invention is believed to control this self-discharge process by removing a surface layer of metal from the electrode and thereby removing any adhering contaminants or impurities.

The treatment of lithium electrodes with an alcohol in accordance with this invention serves to substantially prevent the self-discharge of about 80% of the treated electrodes when they are placed in an electrolyte which comprises sulfur dioxide and in which the dithionite discharge product is soluble. In addition, the extent of self-discharge in the remaining 20% of such treated electrodes is substantially reduced in comparison with untreated lithium electrodes.

The active metal electrode of the electrochemical cell of this invention can be constructed in any of the conventional forms, such as foil, plates, rods, films, powders, compacts or screens, and can be used alone or in combination with either conducting or nonconducting substrates. However, the use of a conducting substrate is not usually preferred since a simultaneous contact of both substrate and active metal with the electrolyte can cause self-discharge of the electrode.

The cathode of the electrochemical cell can be constructed of any material which is electrically conducting and is substantially inert to the electrolyte system. In addition, the cathode material is desirably catalytic with respect to electroreduction of the cathode depolarizer. Preferred materials include metals of the platinum group family, consisting of platinum, iridium, osmium, palladium, rhodium and ruthenium; carbon in any of its common electrode forms such as sintered, compacted or powdered graphite or carbon rod; iron in its various forms, particularly as stainless steel; titanium, nickel, silver, mercury, lead and gold. Less preferred materials are metals of the families of vanadium, chromium and manganese [Groups 5b, 6b and 7b of the Periodic Table of Elements (*Handbook of Chemistry and Physics*, 57th ed., 1976-77, P. B-4)]; zirconium, cobalt, copper, zinc, cadmium, germanium, tin, antimony and bismuth; certain nitrides such as boron nitride; and semi-conductors such as silicon. These materials can be used in any of the forms which are conventional in the art, such as rods, compacts, powders, pastes and the like.

The electrolyte for use in the electrochemical cell of this invention comprises a cathode depolarizer which is electrochemically reduced at the surface of the cathode during discharge of the electrochemical cell. Suitable cathode depolarizers include all materials which are stable when in direct contact with the active metal anode and are also capable of being electrochemically reduced at the cathode during discharge of the electrochemical cell. Suitable cathode depolarizers include, but are not limited to, sulfur dioxide and covalent inorganic oxyhalides and thiohalides. Examples of such oxyhalides and thiohalides include phosphorus oxychloride, monofluorophosphoryl dichloride, monobromophosphoryl dichloride, phosphorus oxybromide, thiophosphoryl chloride, thiophosphoryl bromide, thionyl chloride, thionyl bromide, sulfuryl chloride, selenium oxychloride and mixtures thereof. Preferred cathode depolarizers include sulfur dioxide, thionyl chloride, sulfuryl chloride and phosphorus oxychloride.

In the absence of any surface contamination on the active metal electrode which can initiate self-discharge, the cathode depolarizer is stable when in contact with this electrode. Although the reasons for this are not well understood, it is believed that the active metal electrode reacts with a small amount of the cathode depolarizer to form a thin film of the reaction product on the electrode surface which serves to prevent any further molecules of cathode depolarizer from reaching the active metal of the electrode. For example, in the case of a lithium anode and sulfur dioxide as the cathode depolarizer, it is believed that the anode is passivated by the formation of a thin film of lithium dithionite ($Li_2S_2O_4$) which then prevents further sulfur dioxide molecules from reaching the lithium anode surface and thereby prevents self-discharge. Nevertheless, this thin film permits electrochemical oxidation and reduction of the lithium anode to take place during operation of the cell by passage of lithium cations through the film. At the same time, sulfur dioxide reduction products are formed at the cathode during discharge of the cell.

The electrolyte for use in the electrochemical cell of this invention preferably comprises a liquid cathode depolarizer having dissolved therein at least one, and ordinarily more than one, electrolyte salt which is substantially inert to the other cell components. Such salts are selected and utilized in amounts which are effective to provide an adequate conductivity for efficient operation of the electrochemical cell. Suitable electrolyte salts include, but are not limited to alkali metal salts, alkaline earth metal salts, quaternary ammonium salts, phosphonium salts, pyridinium salts and arsonium salts. However, quaternary ammonium salts, phosphonium salts, pyridinium salts and arsonium salts are preferred, and quaternary ammonium salts and phosphonium salts are highly preferred. These preferred electrolyte salts usually have the ability to render the cell's discharge product relatively soluble in the electrolyte since they contain cations which typically form a soluble salt upon combination with the anionic discharge product which is formed at the cathode. For example, when the electrolyte comprises liquid sulfur dioxide having one or more of these preferred salts dissolved therein, the dithionite discharge product of the electrochemical cell is quite soluble in the electrolyte.

Various combinations of electrolyte salts comprising at least one material selected from the group consisting of quaternary ammonium salts, phosphonium salts, pyridinium salts and arsonium salts in combination with one or more alkali metal salts or alkaline earth metal salts are frequently useful. A preferred combination of electrolyte salts comprises the combination of at least one quaternary ammonium salt with one or more lithium salts. Examples of suitable lithium salts include lithium perchlorate, lithium dithionite, lithium sulfate, lithium tetrafluoroborate, lithium hexafluorophosphate, lithium bromide and lithium chloride.

Quaternary ammonium salts are highly suitable for use as electrolyte salts in the practice of this invention. Preferred quaternary ammonium salts are of the formula:

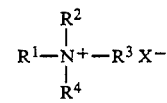

wherein $R^1$, $R^2$, $R^3$ and $R^4$ are independently selected from the group consisting of hydrocarbyl groups containing from 1 to 20 carbon atoms, and $X^-$ is selected from the group consisting of perchlorate, tetrafluoroborate, hexafluorophosphate, dithionite, sulfate, phosphate, chloride, bromide, iodide and fluoride. More preferably, $R^1$, $R^2$, and $R^3$ and $R^4$ are independently selected from the group consisting of alkyl groups having from 1 to 10 carbon atoms, and $X^-$ is selected from the group consisting of perchlorate, tetrafluoroborate, hexafluorophosphate, dithionite, sulfate and bromide. Examples of suitable quaternary ammonium salts include tetrabutylammonium perchlorate, tetrahexylammonium perchlorate, tetramethylammonium tetrafluoroborate, and tetrapropylammonium hexafluorophosphate.

Phosphonium salts are also very suitable for use as electrolyte salts in the practice of this invention, and preferred materials are of the formula:

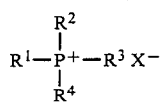

wherein $R^1$, $R^2$, $R^3$ and $R^4$ are independently selected from the group consisting of hydrocarbyl groups containing from 1 to 20 carbon atoms, and $X^-$ is selected from the group consisting of perchlorate, tetrafluoroborate, hexafluorophosphate, dithionite, sulfate, phosphate, chloride, bromide, iodide and fluoride. More preferably, $R^1$, $R^2$, $R^3$ and $R^4$ are independently selected from the group consisting of alkyl groups of from 1 to 10 carbon atoms, and aryl and alkyl-substituted aryl groups of from 6 to 12 carbon atoms; and $X^-$ is selected from the group consisting of perchlorate, tetrafluoroborate, hexafluorophosphate, dithionite, sulfate and bromide. Examples of suitable phosphonium salts include tetrabutylphosphonium tetrafluoroborate, tetraphenylphosphonium perchlorate, and tetraphenylphosphonium hexafluorophosphate.

In addition to the cathode depolarizer and electrolyte salt or salts, the electrolyte for use in the electrochemical cell of this invention can additionally comprise one or more liquid organic or inorganic solvents or cosolvents which lack acidic hydrogen atoms and contain one or more atoms having at least one unshared pair of electrons. For the purposes hereof, "acidic hydrogen atoms" are those which are capable of being abstracted by the active metal electrode. However, strongly basic cosolvents such as amines are not generally desirable.

More specifically, suitable solvents and cosolvents are organic or inorganic liquids which contain at least one element which is selected from Groups 3a, 4a, 5a and 6a of the Periodic Table [*Handbook of Chemistry and Physics*, 57th ed. (1976-77), p. B-4]. Preferred elements from this group include, for example, boron, silicon, nitrogen, phosphorus, oxygen and sulfur as well as combinations of these elements. Organic solvents which contain two or more atoms of such elements in each molecule are particularly suitable.

Preferred liquid organic compounds for use as a solvent or cosolvent in the practice of this invention include, but are not limited to, trialkyl borates, boronic acid esters, borinic acid esters, tetraalkyl silicates, alkylalkoxyl silanes, nitroalkanes, alkylnitriles, dialkyl amides, lactams, tetraalkyl ureas, acetals, ketals, monocarboxylic acid esters, orthoesters, lactones, dialkyl carbonates, alkylene carbonates, orthocarbonates, monoethers, polyethers, monocarboxylic acid anhydrides, dialkyl sulfates, dialkyl sulfites, alkylene sulfites, and sulfones. Specific examples include triethyl borate, diethyl methylboronate, methyl diethylborinate, tetramethyl silicate, trimethoxymethylsilane, nitroethane, acetonitrile, dimethylformamide, 1-methyl-2-pyrrolidinone, tetramethyl urea, 1,1-diethoxy ethane, 2,2-dimethyoxypropane, ethyl acetate, trimethyl orthoformate, γ-butyrolactone, dimethyl carbonate, ethylene carbonate, tetramethyl orthocarbonate, diethyl ether, tetrahydrofuran, ethylene glycol dimethyl ether, acetic anhydride, dimethyl sulfate, dimethyl sulfite, ethylene sulfite, and tetramethylene sulfone.

The following examples are intended only to illustrate the invention and are not to be construed as imposing limitations on it.

EXAMPLE I

Two lithium electrodes were prepared according to the following procedure in a dry room wherein the relative humidity was maintained below 1%.

A sample of lithium foil (Foote Mineral Co.) having a thickness of 0.25 mm was dipped in methanol at a temperature in the range from about −20° to about −55° C. until the surface of the foil was a bright silver color (about 2 minutes). The foil was then removed from the methanol bath and immediately wiped with a lint free cloth (Alpha Wipe) to remove residual traces of methanol. Two strips of lithium were cut from the resulting foil using a pair of stainless steel scissors, the blades of which had first been treated by making about six cuts into another piece of lithium foil which had similarly been etched with methanol. The strips of lithium were then etched with methanol a second time in the manner described above. The thickness of the foil was reduced by about 0.017 mm during the first etching treatment and by about 0.026 mm during the second etching treatment. Care was taken to avoid touching those portions of the etched electrodes which were to be used in contact with electrolyte when incorporated into an electrochemical cell.

EXAMPLE II

The two methanol etched electrodes from Example I were utilized as anodes in an electrochemical cell which contained a stainless steel cathode and an electrolyte which consisted of a sulfur dioxide solution which was 0.2 molar in tetrabutylammonium perchlorate and saturated (0.035 molar) in lithium perchlorate. The open circuit voltage (OCV) of the cell was initially 3.19 volts for one lithium electrode and 3.20 volts for the other. After about 5 hours, the OCV for both lithium electrodes had stabilized at 3.15 volts and remained constant for about 13 hours, after which the experiment was terminated. No self-discharge of either lithium electrode was observed.

EXAMPLE III

A strip of lithium having a width of 1.5 cm, a length of about 8 cm and a thickness of 0.25 mm was cut from a roll of foil obtained from Foote Mineral Co. A nickel tab was attached to one end of the strip to serve as an electrical connection, and the resulting structure was then dipped in a cyclohexane solution of ethylene-propylene-diene terpolymer to mask all but a 2.0 cm length at the end of the strip opposite from the nickel tab. The structure was then utilized as an anode in an electrochemical cell which contained a stainless steel cathode and an electrolyte which consisted of a sulfur dioxide solution which was 0.2 molar in tetrabutylammonium perchlorate and saturated (0.035 molar) in lithium perchlorate. The open circuit voltage (OCV) of the cell as a function of time and the amount of the lithium anode surface area which was subject to self-discharge are set forth in the following tabulation:

| Time, hr. | OCV, volts | Anode Surface Area Subject to Self-Discharge %[a] |
| --- | --- | --- |
| 0 | 2.80 | 3 |
| 1.5 | 2.87 | 15 |
| 3.5 | 2.94 | 30 |
| 21.5 | 1.354 | 55 |

| Time, hr. | OCV, volts | Anode Surface Area Subject to Self-Discharge %[a] |
|---|---|---|
| 42.5 | 1.86 | 55 |

[a]Self-discharge was indicated by the formation of red areas on the electrode surface with a red material streaming into the electrolyte from these areas.

The above-tabulated results serve to demonstrate the severe self-discharge which is typically observed when the electrolyte of this Example III is combined with commercial lithium foil which has not been etched in accordance with this invention.

EXAMPLE IV

Two ethanol lithium electrodes were prepared according to the procedure set forth in Example I except that ethanol was used in place of methanol. The resulting electrodes were used as anodes in an electrochemical cell which contained a stainless steel cathode and an electrolyte which consisted of a sulfur dioxide solution which was 0.2 molar in tetrabutylammonium perchlorate and saturated (0.035 molar) in lithium perchlorate. The open circuit voltage (OCV) of the cell was initially 3.36 volts for both lithium electrodes. The OCV for both lithium electrodes dropped slightly over a period of 48 hours but remained above 3.0 volts. No self-discharge of either lithium electrode was observed.

EXAMPLE V

Two 2-propanol etched lithium electrodes were prepared according to the procedure set forth in Example I except that 2-propanol was used in place of methanol. The 2-propanol etching of the electrodes was very slow and generated a very slow evolution of hydrogen gas. The resulting etched electrodes were mostly black in color, possibly as a result of the formation of a surface deposit of lithium nitride. These electrodes were used as anodes in an electrochemical cell which contained a stainless steel cathode and an electrolyte which consisted of a sulfur dioxide solution which was 0.2 molar in tetrabutylammonium perchlorate and saturated (0.035 molar) in lithium perchlorate. The open circuit voltage (OCV) of the cell was initially 3.26 volts for both lithium electrodes. The OCV for both lithium electrodes dropped slightly over a period of 48 hours but remained above 3.0 volts. One of the lithium electrodes initially had a small area of self-discharge on a vertical cut edge, but this disappeared within 6 hours.

We claim:

1. An electrochemical cell comprising in combination:
   (a) a cathode;
   (b) a nonaqueous, conductive, liquid electrolyte which comprises a cathode depolarizer; and
   (c) a solid electrode comprising at least one metal selected from the group consisting of lithium, sodium, potassium and calcium, said electrode having a surface which has been modified by contact with a liquid etching agent comprising at least one alcohol selected from the group consisting of alcohols which contain up to about 30 carbon atoms.

2. The electrochemical cell as set forth in claim 1 wherein said alcohol is selected from the group consisting of aliphatic alcohols which contain up to about 30 carbon atoms.

3. The electrochemical cell as set forth in claim 1 wherein said alcohol is selected from the group consisting of aliphatic alcohols which contain up to 10 carbon atoms.

4. The electrochemical cell as set forth in claim 1 wherein said etching agent additionally comprises a substantially inert diluent.

5. The electrochemical cell as set forth in claim 1 wherein said contact with the etching agent is effective to remove a minor amount of metal from the electrode surface.

6. The electrochemical cell as set forth in claim 1 wherein said electrode comprises lithium.

7. The electrochemical cell as set forth in claim 1 wherein said cathode depolarizer comprises at least one material selected from the group consisting of sulfur dioxide, oxyhalides and thiohalides, wherein said oxylhalides and thiohalides are covalent inorganic compounds.

8. The electrochemical cell as set forth in claim 7 wherein said cathode depolarizer comprises a material selected from the group consisting of sulfur dioxide, thionyl chloride, sulfuryl chloride and phosphorus oxychloride.

9. The electrochemical cell as set forth in claim 7 wherein said cathode depolarizer comprises sulfur dioxide.

10. The electrochemical cell as set forth in claim 1 wherein said electrolyte comprises a liquid cathode depolarizer having at least one electrolyte salt dissolved therein which is substantially inert to said cathode depolarizer and said electrode.

11. The electrochemical cell as set forth in claim 10 wherein said electrolyte salt comprises a quaternary ammonium salt of the formula:

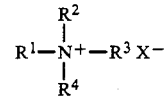

wherein $R^1$, $R^2$, and $R^3$ and $R^4$ are independently selected from the group consisting of hydrocarbyl groups of from 1 to 20 carbon atoms, and $X^-$ is selected from the group consisting of perchlorate, tetrafluoroborate, hexafluorophosphate, dithionite, sulfate, phosphate, chloride, bromide, iodide and fluoride.

12. The electrochemical cell as set forth in claim 10 wherein at least two electrolyte salts are dissolved in said cathode depolarizer and wherein one of said electrolyte salts is a lithium salt and the second is a quarternary ammonium salt.

13. The electrochemical cell as set forth in claim 12 wherein said lithium salt is selected from the group consisting of lithium perchlorate, lithium dithionite, lithium sulfate, lithium tetrafluoroborate, lithium hexafluorophosphate, lithium bromide and lithium chloride.

14. The electrochemical cell as set forth in claim 10 wherein said electrolyte additionally comprises an organic liquid cosolvent for said electrolyte salt, wherein said cosolvent is substantially inert to said cathode depolarizer and said electrode.

15. The electrochemical cell as set forth in claim 1 wherein said cathode comprises carbon.

16. An electrochemical cell comprising in combination:
   (a) a cathode;
   (b) a nonaqueous, conductive, liquid electrolyte which comprises liquid sulfur dioxide having at least one electrolyte salt dissolved therein which is selected from the group consisting of quaternary ammonium salts, phosphonium salts, pyridinium salts and arsonium salts; and (c) a solid electrode comprising lithium, said electrode having a surface which has been modified by contact with a liquid etching agent comprising at least one alcohol selected from the group consisting of alcohols which contain up to about 30 carbon atoms.

17. The electrochemical cell as set forth in claim 16 wherein said etching agent additionally comprises a substantially inert diluent.

18. The electrochemical cell as set forth in claim 16 wherein said electrolyte salt comprises a material selected from the group consisting of quaternary ammonium salts and phosphonium salts.

19. The electrochemical cell as set forth in claim 18 wherein said electrolyte salt comprises a quaternary ammonium salt of the formula:

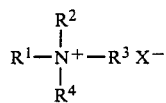

wherein $R^1$, $R^2$, $R^3$ and $R^4$ are independently selected from the group consisting of hydrocarbyl groups of from 1 to 20 carbon atoms, and $X^-$ is selected from the group consisting of perchlorate, tetrafluoroborate, hexafluorophosphate, dithionite, sulfate, phosphate, chloride, bromide, iodide and fluoride.

20. The electrochemical cell as set forth in claim 16 wherein at least two electrolyte salts are dissolved in said sulfur dioxide and wherein one of said electrolyte salts is a lithium salt and the second is a quaternary ammonium salt.

* * * * *